United States Patent [19]
Gonia et al.

[11] Patent Number: 5,500,864
[45] Date of Patent: Mar. 19, 1996

[54] CHECKSUM CALCULATION UNIT AND METHOD FOR ERROR DETECTION ON DATA PACKETS

[75] Inventors: Patrick S. Gonia, Maplewood; James F. Hoff, Shoreview, both of Minn.

[73] Assignee: Honeywell Inc., Minneapolis, Minn.

[21] Appl. No.: 76,827

[22] Filed: Jun. 14, 1993

Related U.S. Application Data

[63] Continuation of Ser. No. 574,822, Aug. 29, 1990, abandoned.

[51] Int. Cl.6 .................................................. G06F 11/10
[52] U.S. Cl. ................................................ 371/53; 371/48
[58] Field of Search .................... 371/37.5, 40.1, 371/48, 53; 364/778, 779, 780, 781, 782, 783, 784, 785

[56] References Cited

U.S. PATENT DOCUMENTS

| | | | |
|---|---|---|---|
| 2,907,526 | 10/1959 | Havens | 364/783 |
| 3,299,260 | 1/1967 | Cohen | 364/783 |
| 3,573,726 | 4/1971 | Towell | 340/146.1 |
| 4,054,788 | 10/1977 | Maitland et al. | 364/786 |
| 4,092,732 | 5/1978 | Ouchi | 371/53 |
| 4,355,390 | 10/1982 | Hellwig et al. | 371/53 |
| 4,390,989 | 6/1983 | Pehrson | 371/53 |
| 4,523,314 | 6/1985 | Burns et al. | 371/40.1 |
| 4,555,784 | 11/1985 | Wood | 371/37 |
| 4,570,215 | 2/1986 | Miura et al. | 364/900 |
| 4,604,750 | 8/1986 | Manton et al. | 371/38 |
| 4,646,307 | 2/1987 | Nishimura | 371/53 |
| 4,672,614 | 6/1987 | Yoshida | 371/38 |
| 4,889,233 | 11/1989 | Ishizuka et al. | 364/786 |
| 4,899,305 | 2/1990 | Needles | 364/786 |
| 4,901,270 | 2/1990 | Galbi et al. | 364/786 |
| 4,901,318 | 2/1990 | Tomisawa | 371/40.1 |
| 4,949,342 | 8/1990 | Shimbo et al. | 371/40.1 |
| 4,964,126 | 10/1990 | Musicus et al. | 371/36 |
| 5,058,110 | 10/1991 | Beach et al. | 370/85.6 |
| 5,065,353 | 11/1991 | Nojiri et al. | 364/786 |

OTHER PUBLICATIONS

Patent Abstracts of Japan, Japanese Patent Application JP870048944, Mitsubishi Electric Corp.
ISO 8073–1986 (E)—Connection Oriented Transport Protocol Specification.
An Arithmetic Checksum for Serial Transmissions, J. G. Fletcher, from IEEE Transactions on Communications, vol. COM–30, No. 1, Jan. 1982.
An Analysis of TCP Processing Overhead, David D. Clark, et al, CH2613–8/88/0000/0284/S01.00 1988 IEEE.

*Primary Examiner*—Robert W. Beausoliel, Jr.
*Assistant Examiner*—My-Phung Chung
*Attorney, Agent, or Firm*—John G. Shudy, Jr.

[57] ABSTRACT

A high performance transport layer checksum calculation unit and method is described for use in computer data communications systems which provides simultaneous general purpose data movement and checksum calculations. Data must be copied from the main memory of a computer in order to be transmitted and often a checksum must be calculated on the data for error detection purposes. The invention involves performing both of these tasks simultaneously thus requiring only one scan of the data memory. The checksum calculation method improves throughput capacity via a unique hardware architecture supporting delayed checksumming of packet segments. A net improvement for packets larger than a certain size is achieved via partial addition during DMA controlled memory access allowing improved average cycle time per data packet segment.

13 Claims, 8 Drawing Sheets

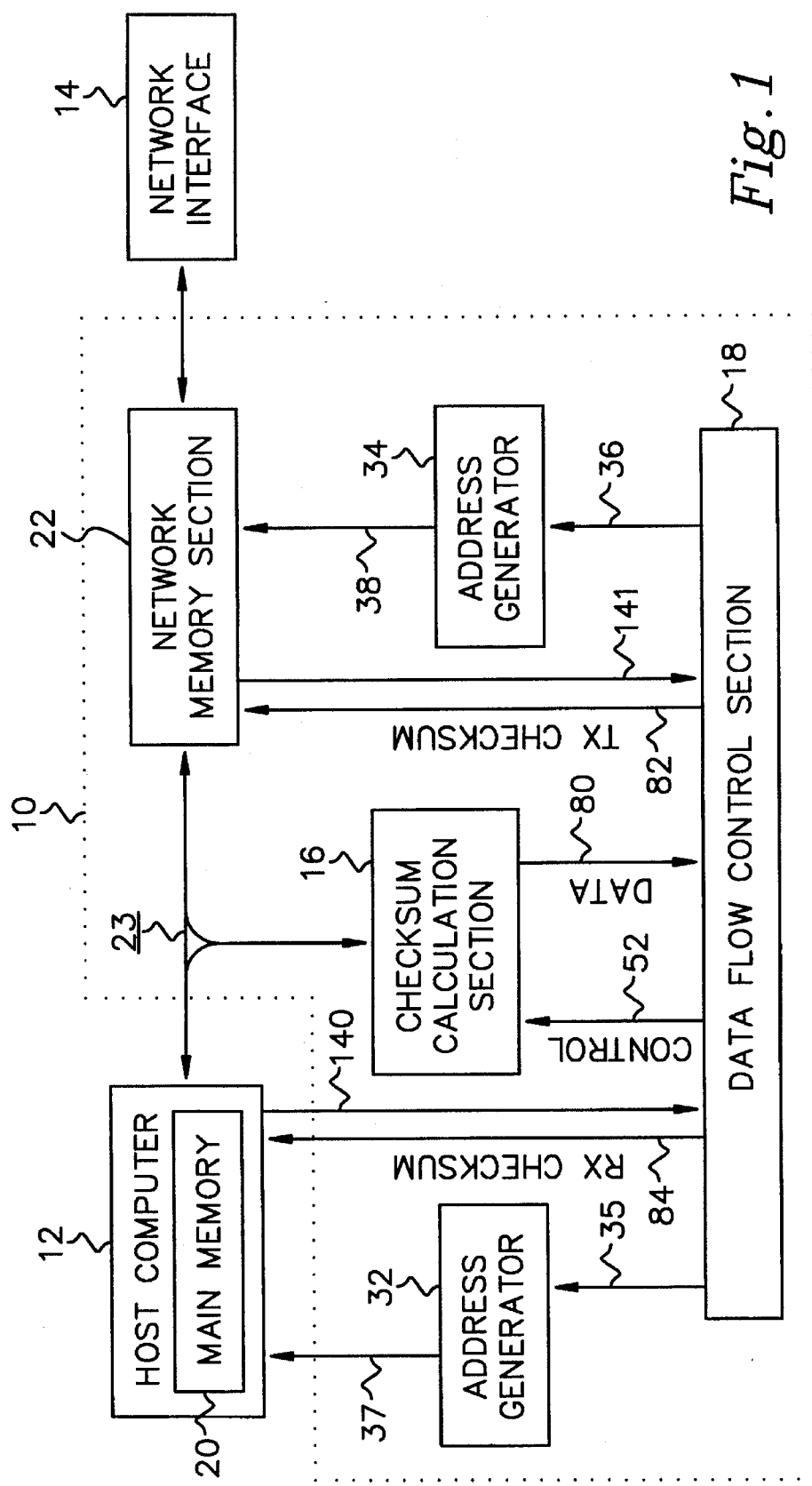

CHECKSUM CALCULATION UNIT AND METHOD FOR ERROR DETECTION ON DATA PACKETS

This application is a continuation, of application Ser. No. 07/574,822, filed Aug. 29, 1990, now abandoned.

FIELD OF THE INVENTION

The invention relates to a method and apparatus for high performance computer data communications systems; specifically to communications systems in which data packets must be quickly and reliably delivered from point to point in space (or time) but which may be corrupted in transit. More specifically the invention is appropriate for calculating the checksum as specified in the internationally Standardized transport layer protocol ISO IS/8073 and can be used for other similar protocols requiring checksumming.

BACKGROUND OF THE INVENTION

One of several problems encountered in communications between data processing devices is that the data packets may be corrupted in transit. Various layered communications protocols are typically utilized to solve these data communications problems. In particular, the transport layer protocol is responsible for the reliable end-to-end transfer of data between systems and it is the primary protocol layer which detects and compensates for these corrupted packets. The method used in the standardized transport layer protocol (International Standard ISO IS/8073) for detection of corrupted packets was proposed originally by Fletcher [Fletcher, J., "An Arithmetic Checksum for Serial Transmissions" IEEE Transactions on Communications., Vol. COM-30, No. 1, January, 1982, pp. 247–252]. This method calculates an arithmetic checksum which is included in packets as they are transmitted in order that errors encountered during transmission may be detected as they are received. This disclosure relates to an improved method for calculating the checksum functions for protocols which utilize Fletcher's arithmetic type error checking functions. Other protocols which use the Fletcher checksum include the protocol for providing the connectionless-mode network service ISO IS 8473 and the Department of Defense Transmission Control Protocol/Internet Protocol (TCP/IP) used in the Arpanet.

Serial transmission of information between computers may be corrupted by errors resulting from hardware malfunctions and environmental disturbances. Various methods are typically used to detect the errors so that they may be recovered from, including checksum functions, product codes and cyclic redundancy checks. These methods provide various levels of protection. Use of the Fletcher checksum is particularly advantageous for general purpose standardized computer communications because the checksum can be easily implemented on high and low performance systems alike. Communications between high performance systems may benefit from an error detection method designed specifically for the high performance application. However the general purpose standardized checksum method is still desired, even in this case, in order to provide compatibility with low performance systems. It is generally recognized however, that the method for implementing the checksum can significantly impact the throughput performance of the communications system. Therefore it is advantageous to provide a method for high speed calculation of the checksum in order that the system throughput may be maintained.

In addition to the detection of errors, the data must be physically copied out of a computer system memory for purposes of transmission and copied into the memory for reception. A major problem in obtaining high communications system throughput is the processing overhead associated with performing operations such as copying and calculating the checksum that operate on each of the bytes of the packet. These two operations in particular are accomplished sequentially in the prior art, and as a result, with an additive time to completely process the packet. Prior art has suggested the benefit of combining software programs which calculate the checksum and perform copy functions. However these known methods are still very performance limiting as a result of using software driven general purpose processor instructions to accomplish the tasks.

Another performance limiting issue in the design of communications systems relates to the common and useful practice of assigning data to various discontiguous locations in the computer system memory. Although beneficial in terms of the optimal use of memory, this practice presents problems for high performance communications wherein the data to be transmitted in a given data communications packet may be contained in multiple data buffers. This further complicates the calculation of a checksum and the reading and writing of buffers for transmission and reception.

SUMMARY OF THE INVENTION

In view of the foregoing, a broad objective of this invention is to provide an economical high performance method and apparatus for detecting the corruption of digital data which may have occurred during transmission or storage.

Another object of this invention is to provide an error detection system in which hardware means are provided for scanning and checking the data without using processor time in software operation other than for initiating and terminating the checking operation.

Another object of the invention is to provide an economical circuit having a minimum number of electrical components for calculating checksums at high speed (memory transfer rate) for both reception and transmission in a data communication system. Another object of the invention is to provide an economical circuit for calculating checksums having a minimum number of inputs per logic calculating component.

Another object of this invention is to provide a high speed (memory transfer rate) checksum calculation unit that performs checksum calculation in parallel with the high speed movement of data from one location to another using a direct memory access (DMA) type automatic address generation circuit thus avoiding the need to rescan the data for either purpose. The copy may be for transmission, reception or some other reason.

A further object of the invention is to provide a data moving checksum circuit with the ability to operate on multiple discontiguous blocks of data.

Other objectives will become evident in view of the following description of an illustrative embodiment.

BRIEF DESCRIPTION OF THE DRAWINGS

FIG. 1 is a schematic showing of a computer system designed for sending and receiving data communications equipped with a checksum calculation unit in accordance with the invention;

DETAILED DESCRIPTION

Figure 1A:
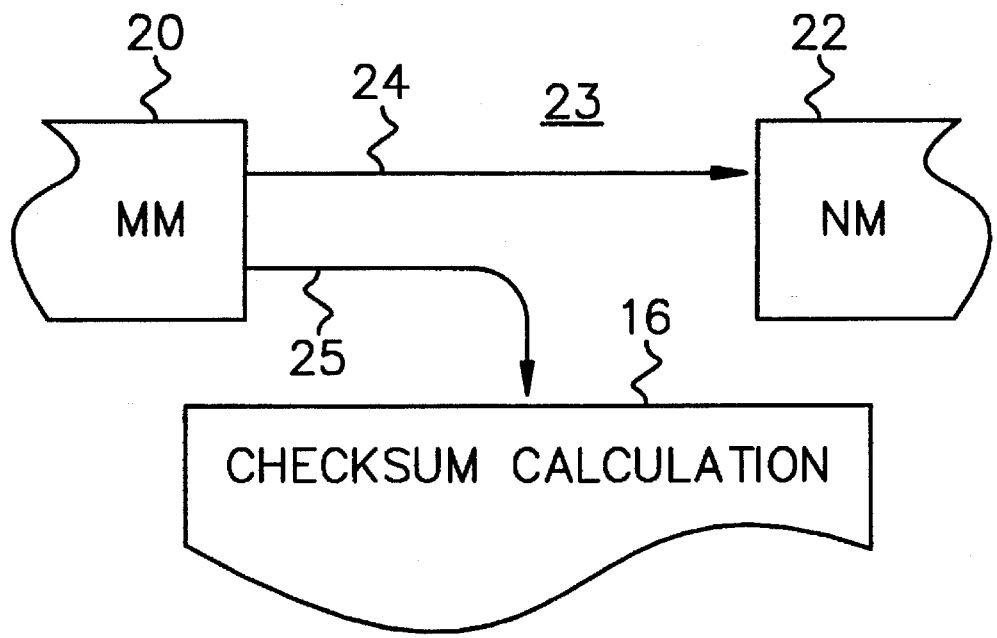
FIGS. 1a and 1b are schematic diagrams showing the transmission and reception modes of the computer system shown in FIG. 1.

Referring to FIG. 1 of the drawings, them is shown a schematic drawing of a data communications system which comprises a checksum calculation unit 10 placed between a general purpose host computer 12 and a network interface 14. Data is transmitted to, and received from, a communications network via interface 14.

The checksum calculation unit 10 includes a checksum calculation section 16, a data flow control section 18, and a network memory section 22. Packets of data will exist in a main or resident memory section 20 of the host computer 12 and in the network memory section 22 which will temporarily store data packets before transmission or after reception through the network interface 14.

The flow of data in the transmission mode is from the resident memory 20 of the host computer 12 from which it is directed in parallel via a bus unit 23 to the checksum calculation section 16 and the network memory section 22. After temporary storage in the network memory section, it flows out to the network interface. The flow of data in the reception mode is from the network interface 14 to the network memory section 22 from which it is in a similar manner directed in parallel via bus unit 23 to the checksum calculation section 16 and to the host computer main memory 20.

Figure 1B:
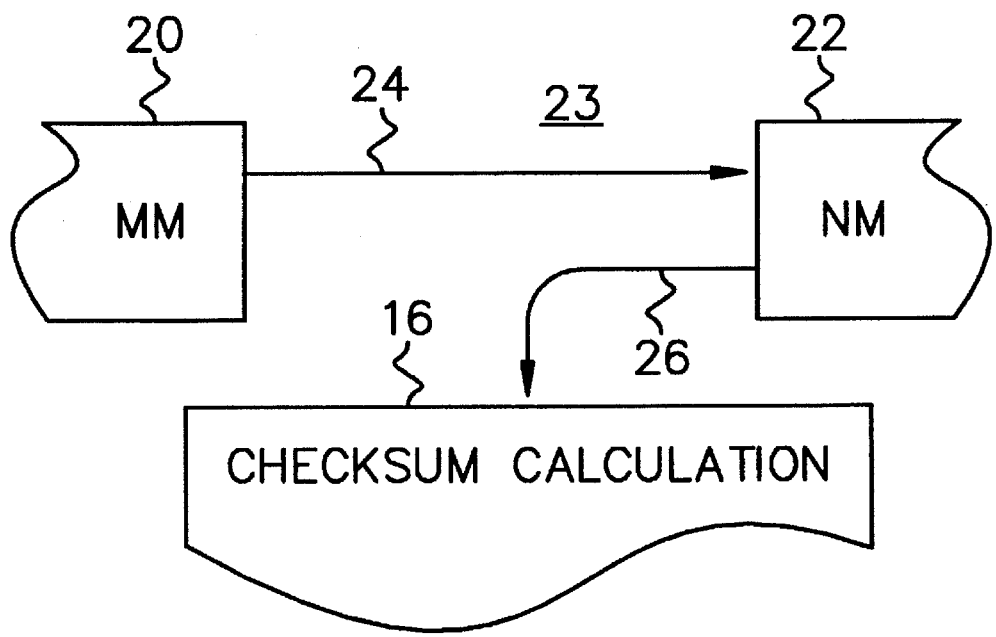

The bus unit 23 is shown schematically in FIGS. 1a and 1b to clarify the data flow directions during the two operational modes of transmission and reception. In this respect a bi-directional 32-bit wide bus 24 provides direct connections between the host computer memory 20 and the network memory section 22 for bi-directional operation.

Bus 25 having also a 32 bit width, connects the checksum calculation section 16 to the host memory 20 and to the network memory 22 via bus 24, for unidirectional operation wherein the data words are always read into the checksum calculation section 16 during either transmission or reception.

The hardware logic of the checksum calculation unit 10 of FIG. 1 includes address generators 32 and 34 controlled via connections 35 and 36 by the data flow control section 18 for respectively scanning via connections 37 and 38, in a direct memory accessing (DMA) mode, the main host memory 20 and network memory section 22.

DMA address generator 32 functions during transmission to move data from the main memory 20 onto the bus 23 for the purpose of simultaneously writing to (1) the network memory section 22 and (2) the checksum calculation section 16. DMA address generator 34 functions during transmission to move the data into the network memory section 22 for temporary storage before transmission via the network interface 14.

During reception, DMA address generator 34 functions to move data from the network memory section 22 onto the bus 23 for the purpose of simultaneously writing to (1) the main memory 20 and (2) the checksum calculation section 16. DMA address generator 32 functions during reception to move the data into the main memory 20 for use by the host computer 12.

Figure 2:
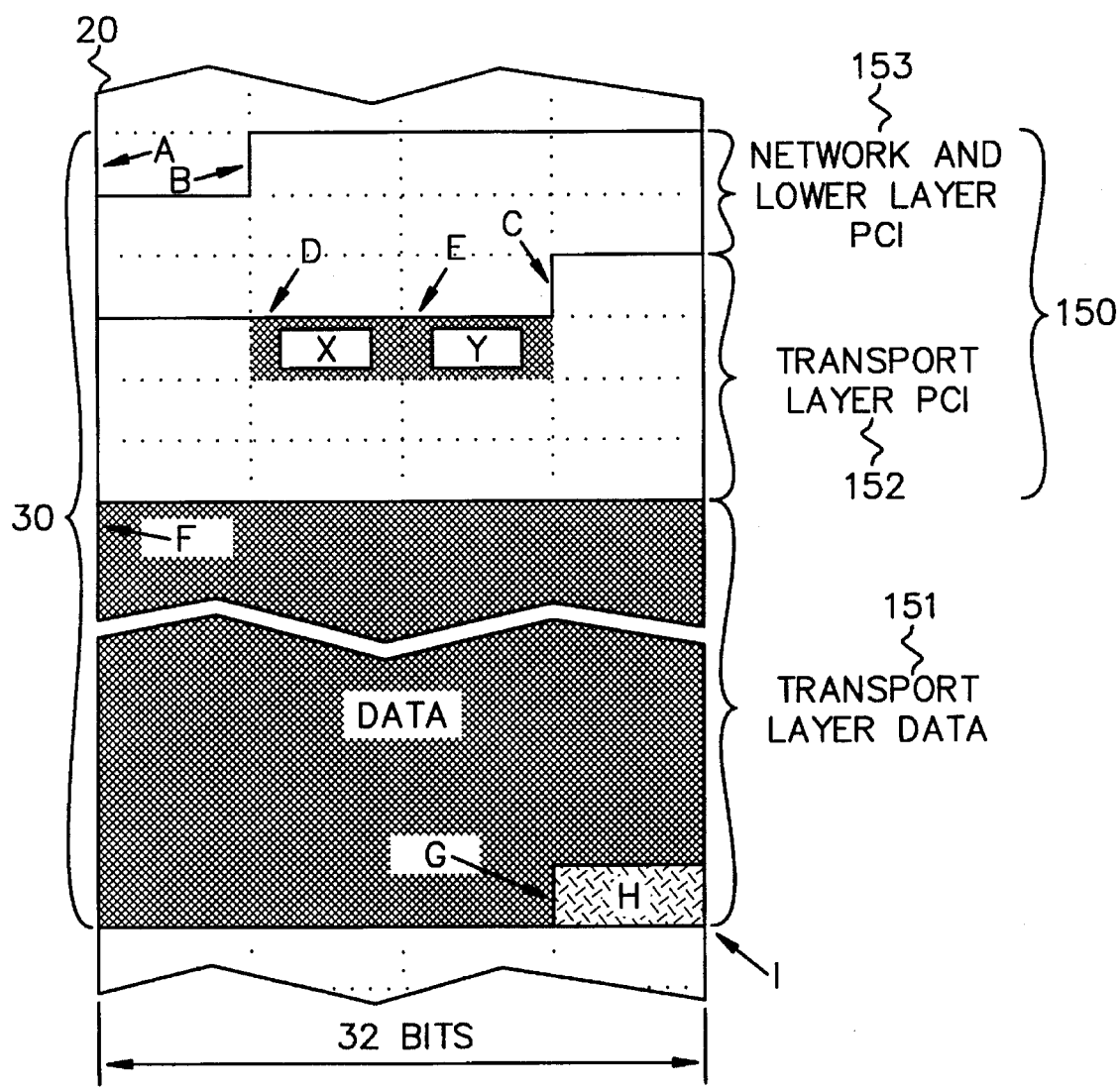
FIG. 2 is a schematic diagram of the memory organization of a typical packet of data used to carry information through a packet switching network to which the checksum innovation of the invention is applicable.

FIG. 2 shows a typical exemplary data packet 30 organized in a 32-bit wide main memory 20 which is subject to being transmitted from the host computer 12 to the network interface 14. The data packet is comprised of a series of 8-bit bytes which specify the protocol control information or PCI for the various layers of protocol 150 and which specify the transport layer data 151. The protocol control information is comprised of the transport layer PCI 152 and the network and lower layer PCI 153.

Boundary A is the first 32 bit doubleword boundary at or before the start of the packet wherein the first DMA operation begins. The actual start of the packet is the start of the network and lower layer PCI which extends from point B to point C. The transport layer header, which extends between the points C and F, includes the first and second checksum related bytes X and Y located at points D and E respectively. The start of the transport layer data is at any point F which may or may not be on a doubleword boundary. The end of the data and simultaneously of the packet is at any point G. The space H, between such end and the end of the 32 bit doubleword I, may be 0,1,2 or 3 bytes which are "zero-filled".

An offset number of bytes between the start of the DMA operation A and the start of the checksum operation is counted between point A and point C. A second offset between the end of the transport layer data G and the end of the DMA operation is counted between point G and point I. The checksum data flow control section 18 utilizes the two offsets to control the checksum calculation section via line 52. This control causes the checksumming to start with the byte immediately following point C and to stop at the byte immediately before point G. Utilizing the offset means, the independent requirements for copying a block of data and checksumming a subset of the copied data may be implemented during simultaneous operations wherein the copying begins and ends at arbitrary points A and I respectively and the checksumming begins and ends at points C and G respectively.

During the transmitting operation data packets 30 in the main host memory 20 are moved in the form of 32-bit wide words to the network memory section 22 via bus connection 24. Simultaneously and in parallel, the data packets are moved to the checksum calculation section 16 via the bus connection 25. The above parallel movement of data is performed in a direct memory access (DMA) operation by the address generator 32 with only one scan of the data in the main memory 20 for each 32-bit wide word.

In preparation for transmission, the data packets 30 in the main memory 20 each have, in accordance with the transport layer checksum algorithm, "sum" and "sum-of-sums" related bytes X and Y which contain the value zero before the checksum is calculated. In accordance with the invention herein the packet data is sent to the checksum calculation section 16 where values for the bytes X and Y are calculated in accordance with the checksum algorithm. At the same time an identical copy of the data, with zero-ed bytes X and Y, is sent from the main memory 20 to the network memory section 22.

The calculated X and Y byte values are output to the network memory section 22 to fill the zero-ed bytes X and Y of the data copy therein via a checksum data output 80, the data flow control section 18 and a connection link 82 between the section 18 and the network memory section 22. The packet data with the byte values X and Y included is then transmitted on the network via the network interface 14.

During the receiving operation data packets 30 in the network memory section 22 are moved in the form of 32-bit wide words to the main memory section 20 via bus connection 24. Simultaneously and in parallel the data packets are moved to the checksum calculation section 16 via the bus connection 25. The above parallel movement of data is performed in a direct memory access (DMA) operation by the address generator 34 with only one scan of the data in the network memory section 22 for each 32-bit wide word.

The data packets 30 received in the network memory section 22 have, in accordance with the transport layer checksum algorithm, complementary "sum" and "sum-of-sums" related bytes X and Y having specific values which were calculated by a checksum operation from a transmitting station. During the receiving operation each transmitted data packet is checked for error at the receiving station by calculating actual sum and sum-of-sums values for all of the bytes in the transport layer packet from points C to G in FIG. 2. Each value will equal zero in the absence of error as a direct result of the specific sum and sum-of-sums related values stored in bytes X and Y by the transmitting station. The checksum calculations upon reception provide error detection by continually checking each received data packet for zero sum and zero sum-of-sums values.

Values for the sum and sum-of-sums bytes are output to the main memory 20 via the checksum data output 80, the data flow control section 18 and a connection link 84 between the control section 18 and the main memory 20 to indicate the correct or incorrect reception of the packet.

Figure 3:
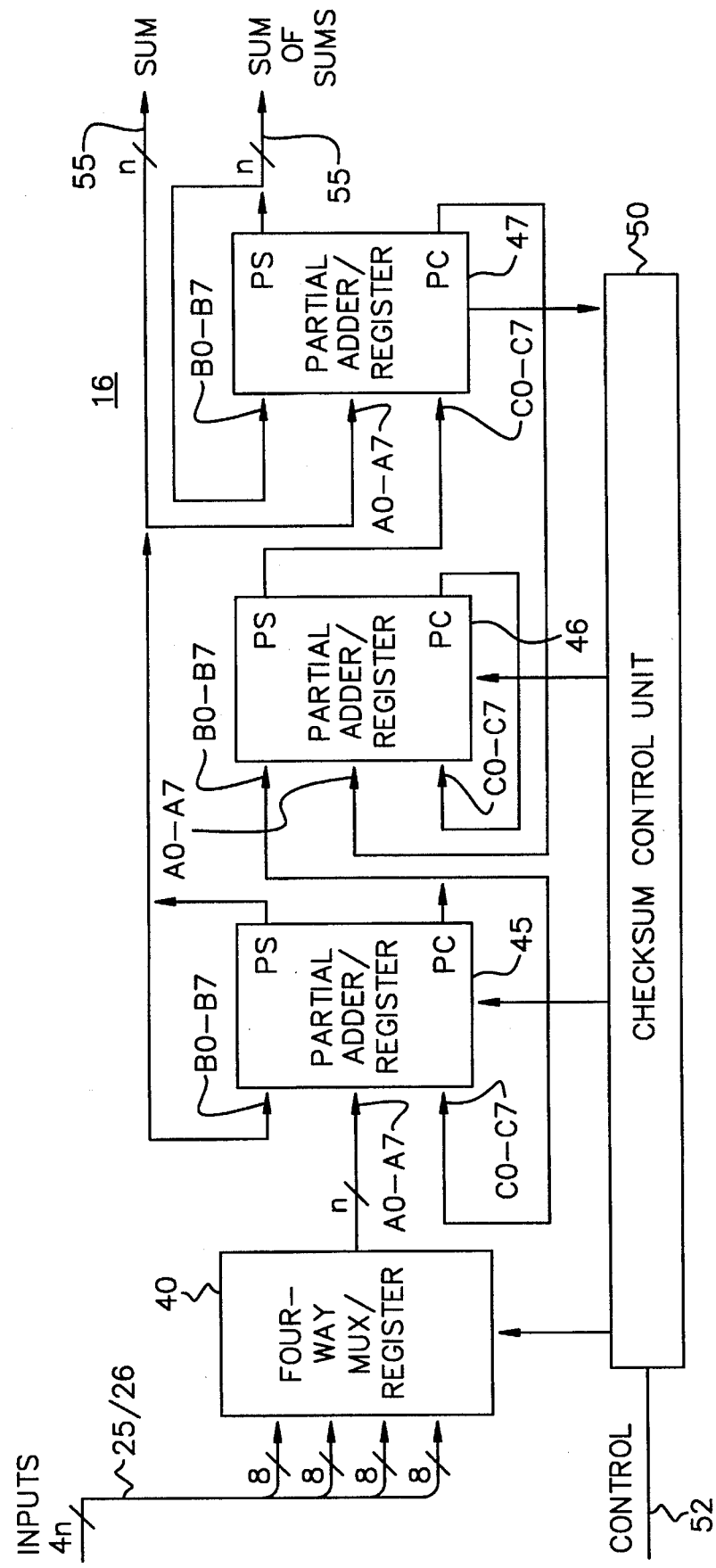
FIG. 3 is a schematic diagram of the checksum calculation section of the checksum calculation unit shown in FIG. 1.

The checksum calculation section 16 of FIG. 1 is shown in schematic detail in FIG. 3. The input side of the section 16 is connected in an effective sense to the data bus 25 to receive data 32 bits at a time while data is being move between memories 20 and 22 during transmission and reception A four-way multiplexer/register unit 40 feeds a series of partial adders 45, 46, and 47, one byte at a time.

The checksum calculation section 16 includes a checksum control unit 50 which is connected to the multiplexer unit 40 and the partial adders to effect control thereof. A control connection 52 (shown in FIG. 1) is provided between the data flow control section 18 and the checksum control unit 50.

A data output 55 of the checksum calculation section 16 consists of two 8-bit words labeled "sum" and "sum-of-sums" which are the values required by the transport layer checksum algorithm in the case of reception. The output 55 is "zero" for both the sum and sum-of-sums bytes in the event that no errors are detected in the received packet. The result is non-zero otherwise. In transmission mode the output values 55 are utilized in a relatively minor calculation which is performed by data flow control section 18 and which is specified in the transport layer protocol standard to produce the exact checksum bytes X and Y which are written into the data packet before transmission.

Referring to FIG. 3, and assuming the equipment is in a transmitting mode, the bus 25, which is a 32-bit wide word from the main memory 20, is accessed by the multiplexer 40 which divides it into four 8-bit (n=8) words which are applied sequentially to the A0 to A7 inputs of the partial adder 45.

With the connection configuration shown in FIG. 3, partial adder 45 is operable to independently generate the required "sum" value (modulo 255) for the data output 55. The generation of a "sum-of-sums" value (modulo 255), requires the joint action of all three of the partial adders 45, 46 and 47 with the connection configuration shown in FIG. 3. These output values 55 are utilized to calculate the checksum bytes X and Y which are written into the data packet before transmission.

If the equipment is in a receiving mode, the bus 25, is similarly accessed by the multiplexer 40 which divides it into four 8-bit (n=8) words which are applied sequentially to the A0 to A7 inputs of the partial adder 45. In identical operation, partial adder 45 is operable to generate the required "sum" value for the data output 55 and the "sum-of-sums" value is developed via the joint action of all three of the partial adders 45, 46 and 47. The data flow control section 18 relays the values for the sum and sum-of-sums values to the main memory 20 of the host computer 12 via line 84 (shown in FIG. 1). The host computer makes a determination of the error free reception of the packet based on these values being both zero or not.

In order that the checksum calculation section does not act as a performance limiting bottleneck with respect to the maximum speed possible in the case of a DMA driven memory to memory copy operation acting alone, the checksum operation must be performed at a speed which is four times the speed of the memory transfer. That is, four bytes must be checksummed during the time of one 32 bit DMA transfer.

The checksum operations in the embodiment disclosed herein are performed by the partial adders 45, 46, and 47 constructed with eight full adders each being one-bit-wide and operating in parallel to form a "partial adder". One such partial adder is shown in FIG. 4 which comprises eight one-bit-wide full adders 60 to 67, and an 8-bit wide "partial sum" output register 71 and an 8-bit wide "partial carry" output register 72.

Figure 4:
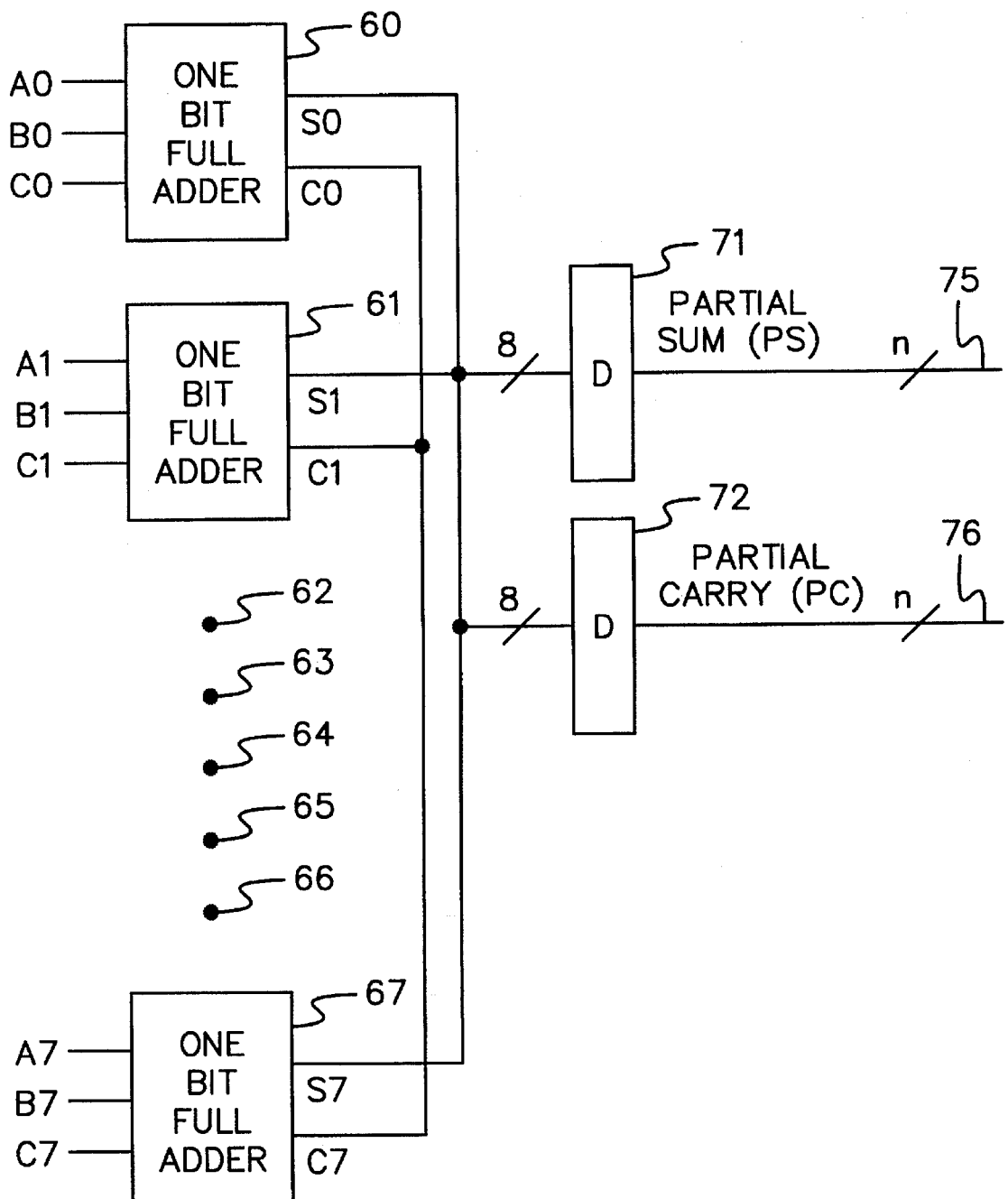
FIG. 4 is a schematic diagram of a partial adder of the type utilized for the checksum calculation unit.

Each one-bit-wide full adder has three inputs for addition of three bits (An and Bn and a carry-in Cn) and thus each of the partial adders has 24 inputs which accommodate three 8-bit words A, B, and C as indicated in FIG. 4. Each one-bit-wide full adder has two output bits for sum Sn and carry Cn and each partial adder thus has an 8-bit bus 75 connected to the register 71 which outputs a "partial sum" value and an 8-bit bus 76 connected to the register 72 which outputs a "partial carry" value. Although the single bit adders operate independently, their output bits collectively stored in registers 71 and 72 have 8-bit binary weight significance as a normal binary sum output would.

The partial adder is "partial" in that it does not take into consideration the propagation of carry bits through the adder bit positions (from carry-out bit to carry-in bit) from the least significant bit position to the most significant position in each addend cycle. By avoiding the wait for the carries to propagate through the adder to produce a correct sum output, the adder may sequentially add a list of binary words with a very fast cycle time with a minimum delay per word since each one-bit-wide adder may operate independently and in parallel.

Alternatively, to take carries into consideration without waiting for carry propagation, a complete sum result could be developed at each output bit position by considering all 24 input bits in terms of their effect on the output sum bit. This method can operate at high speed but has the disadvantage of very large numbers of logic inputs to be considered for each output bit and thus high complexity in particular for wide binary words. The small number of inputs required per bit position in the invention results from a willingness to substitute a partially completed sum (in two parts) for a complete sum at each sequential summing operation preceding the last.

The "partial sum" output 75 at each cycle boundary is not the actual sum of the previously added addends since it lacks consideration of the carry values. The partial carry output 76 has a similar deficiency. If these two outputs 75 and 76 were to be completely summed, the output would be the correct running sum for the previous addends. However in the invention a complete sum is never available until the final result is developed.

To account for the deficiency, the partial carry output is left shifted, to the next higher order bit position and added together with the partial sum and the next addend in the next adding cycle as shown in FIG. 3. The left shift occurs at connection points C0–C7 in end-around carry fashion implementing the required modulo 255 arithmetic. This results in a sum output in the first adder 45 which is not the final correct sum until sufficient cycles have been executed, after the last non-zero addend has been added, to allow all remaining partial carries to be added. 7 cycles (in the case of an 8 bit addend), after the incoming addends end and zero values are substituted for the addends, the partial carry output will be zero and the partial sum output will contain the completed (non-partial) sum result. Thus, although additional cycles are needed to produce the final sum result, each cycle may be executed at faster speed. When adding a large number of addends there is thus a net savings in time to produce the final sum.

Referring to the method of developing the sum-of-sums, this addition must add together the latest sum value with the running total sum-of-sums value. These values each come in two parts because of the partial addition method used. As a result the sum-of-sums addition must add together four inputs which consist of two new partial inputs for the sum and two running total partial inputs for the sum-of-sums. The result is developed using the second and third partial adders 46 and 47. The new partial inputs for the sum consist of:

1) the new partial sum (input at A0–A7 on partial adder 47), and
2) the new partial carry (input at B0–B7 on partial adder 46).

The sum-of-sums running total partial inputs are:

3) the current partial sum-of-sums (input at B0–B7 on partial adder 47), and
4) the current partial carry from the sum-of-sums addition cycle (input at A0–A7 on partial adder 46).

These four inputs (rather than three in a normal adder: A, B & carry-in) are effectively partial summed in the two stage sum-of-sums adder comprising the second and third partial adders 46 and 47. Since this addition is also "partial", two additional output values are created. The extra partial values generated by the partial addition process namely the partial sum and partial carry from partial adder 46 must be taken into account in the development of the sum-of-sums results. These are accounted for at inputs C0–C7 on partial adder 47 and C0–C7 on partial adder 46. Thus the four input summation operation required to develop the sum-of-sums result using the partial addition method is achieved using the simple, three input partial adders 46 and 47.

The method of connecting the two partial addition stages 46 and 47 allows the final sum-of-sums result to remain in the third partial adder 47 rather than flip-flopping between the two on alternating cycles. In effect, the partial adder 46 is used strictly for summing of partial carry inputs whereas partial adder 47 is used strictly for summing of partial sum inputs. Since the partial carries are reduced to zero after their effects are fully accounted for, both outputs of the partial adder 46 will be zero after all carries are accounted for. Thus, it is only necessary to make sure that there are seven or more additional cycles after the last non-zero addends are received from 45 to ensure that the result is correct and readable from the partial sum output of the third partial adder 47.

Figure 5A:
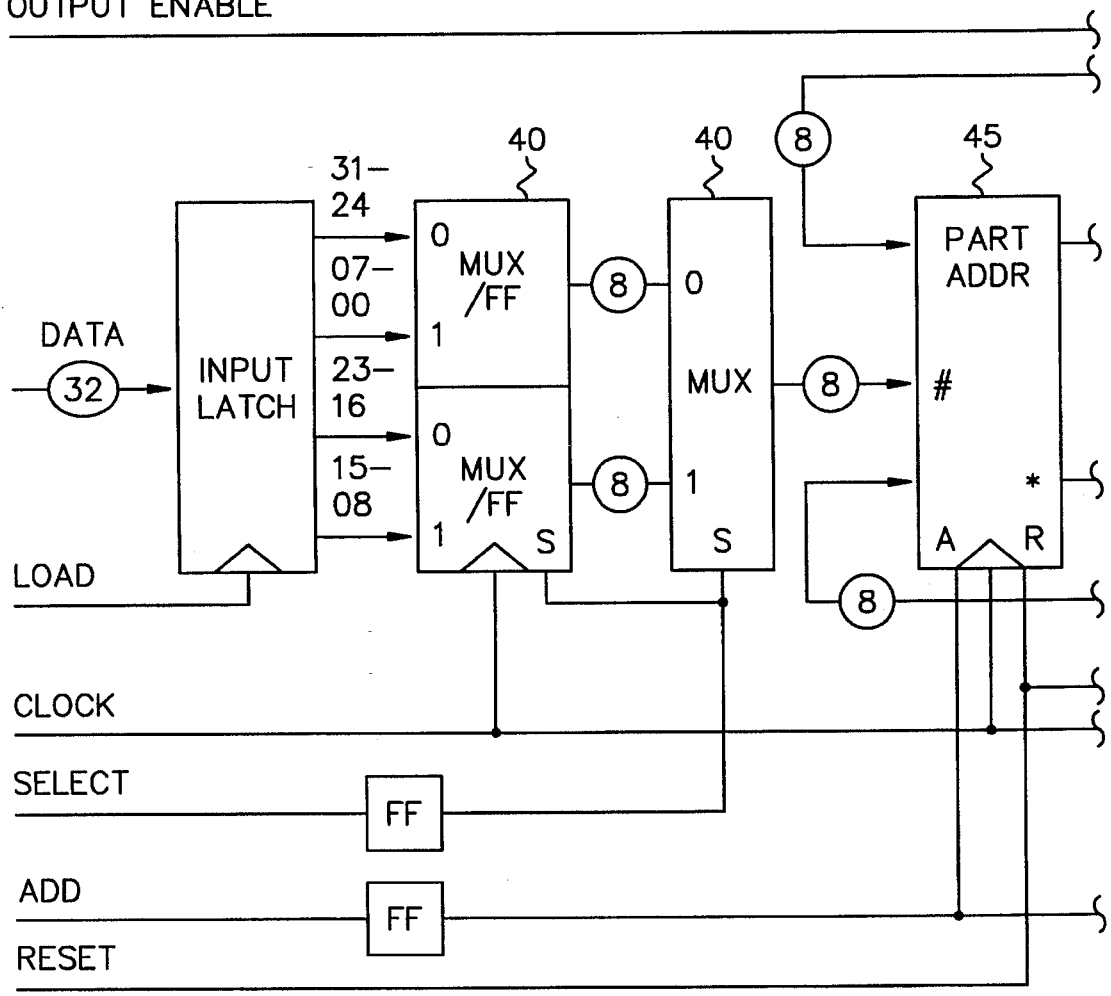
FIG. 5 is schematic diagram of a practical embodiment of the checksum calculation section of the checksum calculation unit shown in FIG. 3.
Figure 5B:
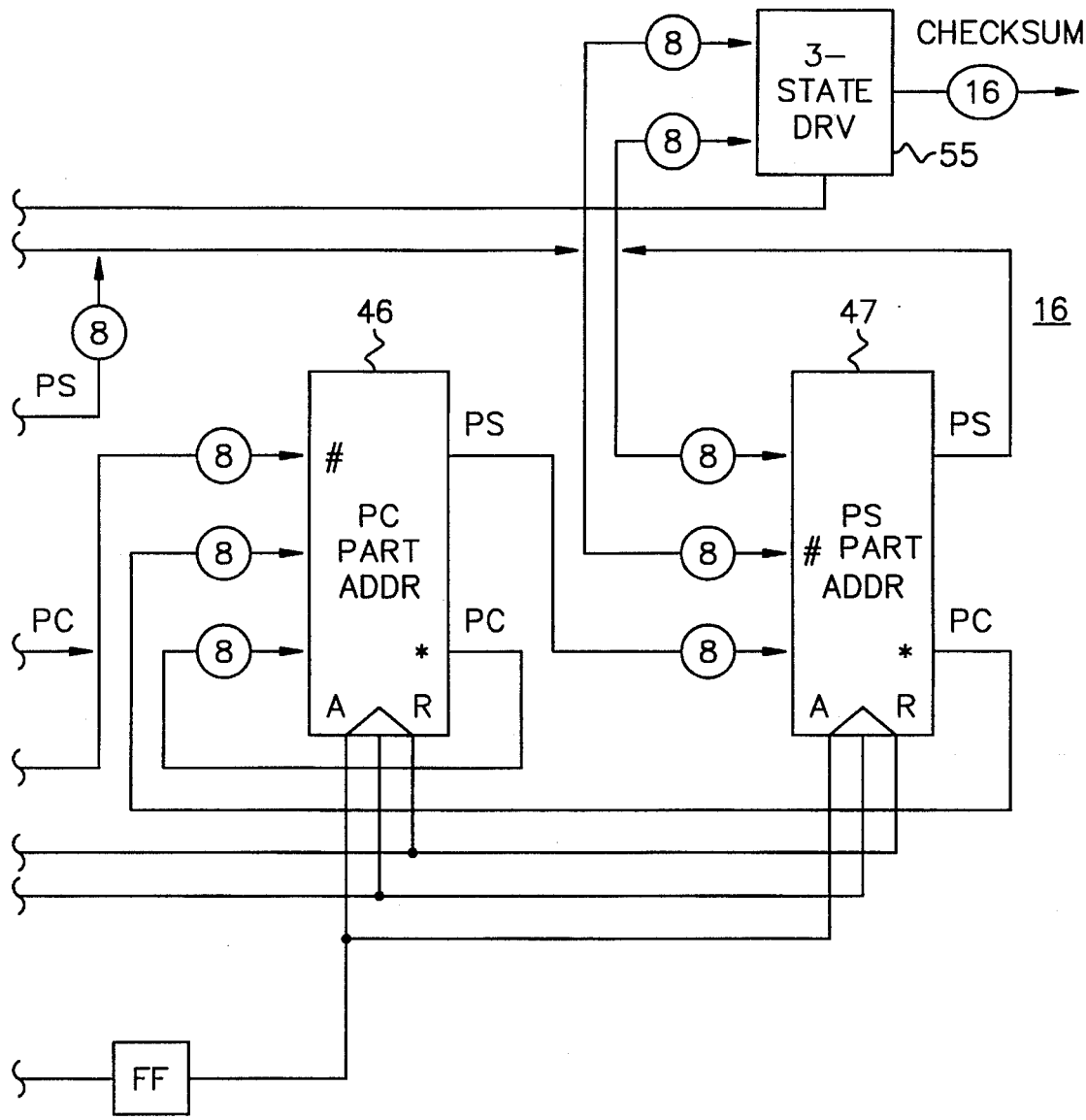

A practical embodiment of the checksum calculation section 16 is shown in FIG. 5. in which corresponding hardware components have the same numerals.

Referring to FIG. 1, in some cases, the data packet to be checksummed may be stored in a group of separate data buffers discontiguously located in different sections of the host memory 20. In this case the checksumming operation utilizes the address generator 32 in a buffer chaining mode which effects greater efficiency by linking the separate packet parts together into a single logical packet for checksumming and transmission. The host computer 12 is thus not required to organize the separate data buffers into a contiguous data buffer before the control section 18 and address generator 32 effect transmission and checksumming thereof on the bus 23.

Figure 6:
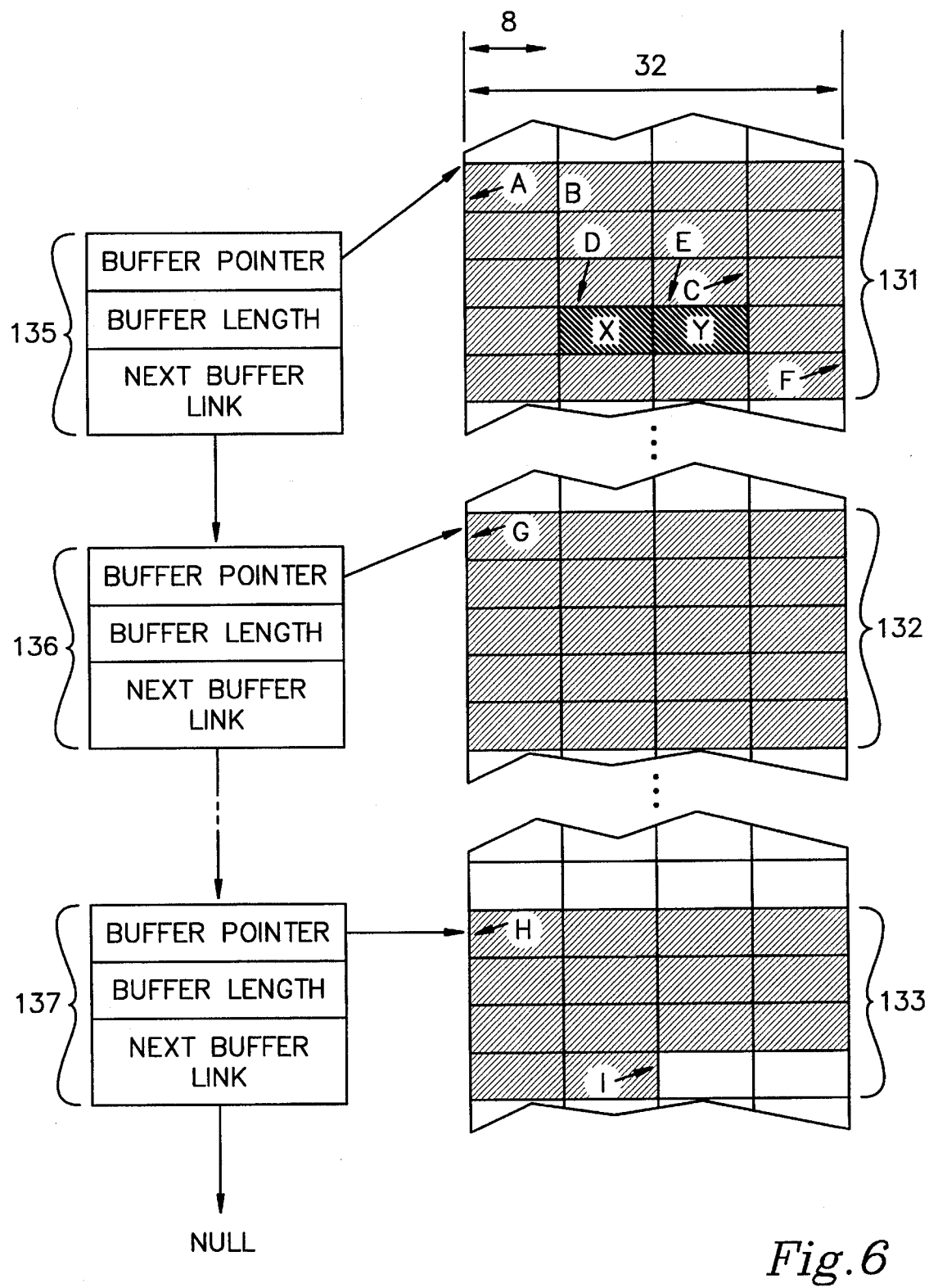
FIG. 6 is a schematic diagram of a typical packet of data as shown in FIG. 2 except that a buffer chaining feature is illustrated wherein the packet has noncontinuous sections thereof of memory.

FIG. 6 shows a packet 30 which is illustrated as having three parts 131, 132 and 133 thereof discontiguously located in different sections of the host memory 20. Buffer descriptors 135, 136 and 137, also in memory 20, are provided respectively for each of the packet parts linking them together and providing the data flow control section 18 with pointers to each separate packet part. Each buffer descriptor has three fields which are (1) a pointer to the start of a packet part, (2) the length of the packet part, and (3) a pointer or "link" to the next buffer descriptor. The word "NULL" pointed to by the next buffer link of the last buffer descriptor 137 indicates to the data flow control section 18 that there are no more packet parts associated with a given packet.

The control section 18 operates in conjunction with the address generator 32 and the buffer descriptors to sequentially effect loading of the packet data parts 131, 132 and 133 onto the bus 23 which directs them as data streams to the checksum calculation section 16 and the network memory section 22. Buffer pointers from each of the buffer descriptors are copied from the main memory section 20 and are loaded into the data flow control section 18 via line 140 where they are accessible to the address generator 32.

The address generator loads data buffer 131, starting at point A, 32 bits at a time onto bus 23 until it gets to point F where the buffer chaining operation is effected. This process is repeated for data buffers 132 and 133 via buffer descriptors 136 and 137 until a complete packet has been moved and checksummed.

A similar buffer chaining operation may be utilized for purposes of writing into discontiguous buffer locations in the network memory section 22 if desired for large data packets. A line 141 is accordingly provided to load next pointer values from memory section 22 to the data flow control section 18 where they are accessible to the address generator 34.

The calculation of checksum in data reception mode (FIG. 1b) is similarly executed utilizing buffer chaining operation with the two address generators and the data flow control section 18.

The invention is also advantageously utilized in situations wherein the communications requirements or host system requirements preclude the movement of data out of the host memory until the checksum has been calculated and the X and Y values are inserted into the packet. In this situation, the checksum calculation unit (FIG. 1) operates in a similar manner to calculate the checksum at the command of the host computer however the data is not stored in the network memory section while the checksum is being calculated. In this case the network memory section 22 and the associated address generator 34 are not required for calculating the checksum. The X and Y values are returned to the host memory 20 rather than the network memory 22 via line 84. The unit provides a rapid calculation of the checksum without requiring extensive host computer software processing steps.

In the receive mode, the corresponding requirement allows the checksum to be calculated only after the packet has been completely stored in the host main memory 20. In this mode the checksum calculation unit operates to access the received packet in the host main memory using address generator 32 and bus 23 to calculate the checksum. The sum and sum-of-sum values are available to the host memory 20 via line 84.

It will be obvious to those skilled in the art that numerous modifications of the present invention can be made without departing from the spirit of the invention which shall be limited only by the scope of the claims appended hereto.

It is claimed:

1. A data communication system interactive so as to facilitate a flow of data between at least a main memory and network memory, said data communication system comprising:

an adder unit having at least one partial adder for calculating checksum values and inputs, a checksum calculating means comprises an n-bit data byte delivery means to deliver a series of n-bit data bytes (which is called "checksum calculation results"), derived from input data, to the inputs of said adder unit, and a first direct memory accessing address generator connected to the main memory and a second direct memory accessing address generator connected to the network memory to move data in a form of data packets, each data packet having a first plurality of bytes which specify protocol information, a second plurality of bytes which specify checksum information and a third plurality of bytes which specify a block of data, to flow in one of either of two directions: from the network memory to main memory and simultaneously to checksum calculating means, or alternatively, from main memory to network memory and simultaneously to said checksum calculating means; and means of calculating values from the checksum calculation results and placing these values into the data packets.

2. The data communication system according to claim 1 wherein said checksum calculating means complies with a protocol checksum algorithm.

3. The data communication system according to claim 1 wherein said network memory and said main memory comprise a data memory and a control unit which directs address generators to move data to two locations simultaneously and in parallel, one of said locations being the checksum calculating means having the at least one partial adder, and the other one being selected from one of either said network memory or said main memory the direction of said selection being dependent on the direction of data flow.

4. The data communication system according to claim 1 wherein said checksum calculating means comprises three partial adders, said adders being arranged in series as adders one, two and three to receive transmitted bytes of data so that:

adder one generates a sum result iteratively, by adding the value of a currently received word with partial sum and partial carry values generated by the adder one in the previously run cycle, yielding the running sums of the transmitted bytes of data;

adder two sums the value of the partial carries from adders one, two and three from the previously run cycle; and adder three generates a sum-of-sums result by summing the partial sum values from adders one, two, and three from the previously run cycles, yielding the successive running sum of sums of the transmitted bytes.

5. The data communication system according to claim 4 wherein said arrangement with partial sums computed in adder three and partial carries computed in adder two, provides for said sum-of-sums results to be maintained at the output of adder three after the last byte of the transmitted data is processed and a required number of summing cycles is completed.

6. The data communication system according to claim 1, said first direct memory accessing address generator includes buffer chaining means allowing multiple discontinuous blocks of data located in different sections of the main memory to be checksummed by linking separate discontinuous blocks together into a single logical group of data.

7. The data communication system according to claim 1 such that said partial adders comprise of a plurality of one-bit wide full adders, having three inputs for addition and two outputs for carry and sum values, all operating independently and said one-bit wide full adders operating in parallel allowing partial adders to add without taking into consideration the propagation of carry bits through the adder bit positions during the addend cycle.

8. A data communication system comprising:

a checksum calculation circuit, having partial arithmetic summing circuitry, which complies with a protocol checksum algorithm;

means for applying n-bit data bytes to partial arithmetic summing circuitry;

means for outputting checksum calculation results from the arithmetic summing circuitry; and means for calculating values from the checksum calculation results and placing these values into data packets, each data packet having a first plurality of bytes which specify protocol information, a second plurality of bytes which specify checksum information and a third plurality of bytes which specify a block of data, which will be transmitted with said n-bit data bytes so that when the checksum calculation results are calculated again during reception by an identical data communication system which is linked by said data communication system to receive said data packets, a sum, and a sum of sums results will indicate whether there is an error.

9. The data communication system according to claim 8 wherein said partial arithmetic summing circuit generates a sum value by calculating a sum of bytes of said data packets and a sum-of-sums value by adding successive sums to the successive running sums.

10. The data communication system according to claim 8 wherein the arithmetic summing circuit includes three partial adders arranged in series so that a first one of said partial adders generates said sum values and all three of said partial adders operate jointly to generate said sum-of-sums values.

11. The data communication system according to claim 10 wherein said partial adders are arranged in series where the partial sums are computed in adder three and partial carries are computed in adder two so that the partial sum output of adder three produces a total sum value which equals the sum of sums of the transmitted bytes after the last byte in a packet has been processed and a number of summing cycles required to clear the carries is completed.

12. The data communication system according to claim 10 wherein each of said partial adders has inputs (A0–A7), (B0–B7), and (C0–C7) and outputs (PS) and (PC).

13. A data communication system of a type having a checksum calculation circuit, operable pursuant to a protocol for calculating sum and sum-of-sum values, comprising:

sum and sum-of-sum outputs;

first, second, and third n-bit partial adder units, each of said partial adder units having a 3 n-bit sets of added inputs (A), (B), and (C), a set of n-bit partial sum outputs (PS), and a set of n-bit partial carry outputs (PC);

means for applying an n-bit data byte to said inputs (A) of said first partial adder unit; means for applying left shifted (PC) outputs of said first partial adder unit to said (C) inputs thereof and to said (B) inputs of said second partial adder unit;

said (PS) outputs of said first partial adder being applied to said (B) inputs thereof and to said sum output and to said (A) inputs of said third partial adder;

means for applying left shifted (PC) outputs of said second partial adder unit to said (C) inputs thereof;

said (PS) outputs of said second partial adder unit being applied to said (C) inputs of said third partial adder unit;

means for applying left shifted (PC) outputs of said third partial adder unit to said (A) inputs of said second partial adder unit; and said (PS) outputs of said third partial adder unit being applied to said (B) inputs thereof and to said sum-of-sums output.

* * * * *